(12) United States Patent
Daniels et al.

(10) Patent No.: US 7,083,085 B1
(45) Date of Patent: Aug. 1, 2006

(54) VERIFYING FINANCIAL SERVICES CARD TRANSACTIONS USING TAGS

(75) Inventors: Fonda J. Daniels, Cary, NC (US); Timothy Earl Figgins, Raleigh, NC (US); David Bruce Kumhyr, Austin, TX (US); John Kenneth Senegal, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/908,444

(22) Filed: May 12, 2005

(51) Int. Cl.
*G06K 5/00* (2006.01)
(52) U.S. Cl. .................................................. 235/380
(58) Field of Classification Search ................ 235/380, 235/382; 705/16–18
See application file for complete search history.

(56) References Cited

U.S. PATENT DOCUMENTS

| | | | | |
|---|---|---|---|---|
| 4,525,713 A * | 6/1985 | Barletta et al. | .......... | 340/10.31 |
| 5,288,978 A * | 2/1994 | Iijima | ......................... | 235/380 |
| 6,529,880 B1 | 3/2003 | McKeen et al. | .............. | 705/17 |
| 2002/0178063 A1 | 11/2002 | Gravelle et al. | ............... | 705/17 |
| 2003/0001009 A1 | 1/2003 | Collins et al. | ............... | 235/385 |
| 2003/0187787 A1 | 10/2003 | Freund | ......................... | 705/39 |
| 2003/0222792 A1 | 12/2003 | Berman et al. | .......... | 340/932.2 |
| 2004/0100363 A1 | 5/2004 | Lane et al. | ................. | 340/5.86 |
| 2004/0118930 A1 | 6/2004 | Berardi et al. | .............. | 235/492 |
| 2004/0124982 A1 | 7/2004 | Kovach | ................... | 340/572.1 |
| 2004/0233040 A1 | 11/2004 | Lane et al. | ................. | 340/5.86 |
| 2005/0033686 A1 | 2/2005 | Peart et al. | .................... | 705/39 |
| 2005/0124408 A1 * | 6/2005 | Vlazny et al. | ................. | 463/28 |

\* cited by examiner

*Primary Examiner*—Thien M. Le
*Assistant Examiner*—Lisa M. Caputo
(74) *Attorney, Agent, or Firm*—David R. Irvin

(57) ABSTRACT

For added security against fraud, a financial services card such as a credit card is paired with a separate tag such as an RFID tag. A system for minimizing fraud includes a card reader for reading a card ID, a tag reader for reading a tag ID, and a controller for comparing the card ID with the tag ID, and approving or rejecting a card transaction based on the comparison. A method for minimizing fraud includes reading a card ID from the financial services card, reading a tag ID from the tag, comparing the tag ID with the card ID, and approving or rejecting a transaction based on the comparison. The card reader may send a security stamp to the tag, which may combine and encrypt a partial tag ID and the security stamp to provide the tag ID.

1 Claim, 4 Drawing Sheets

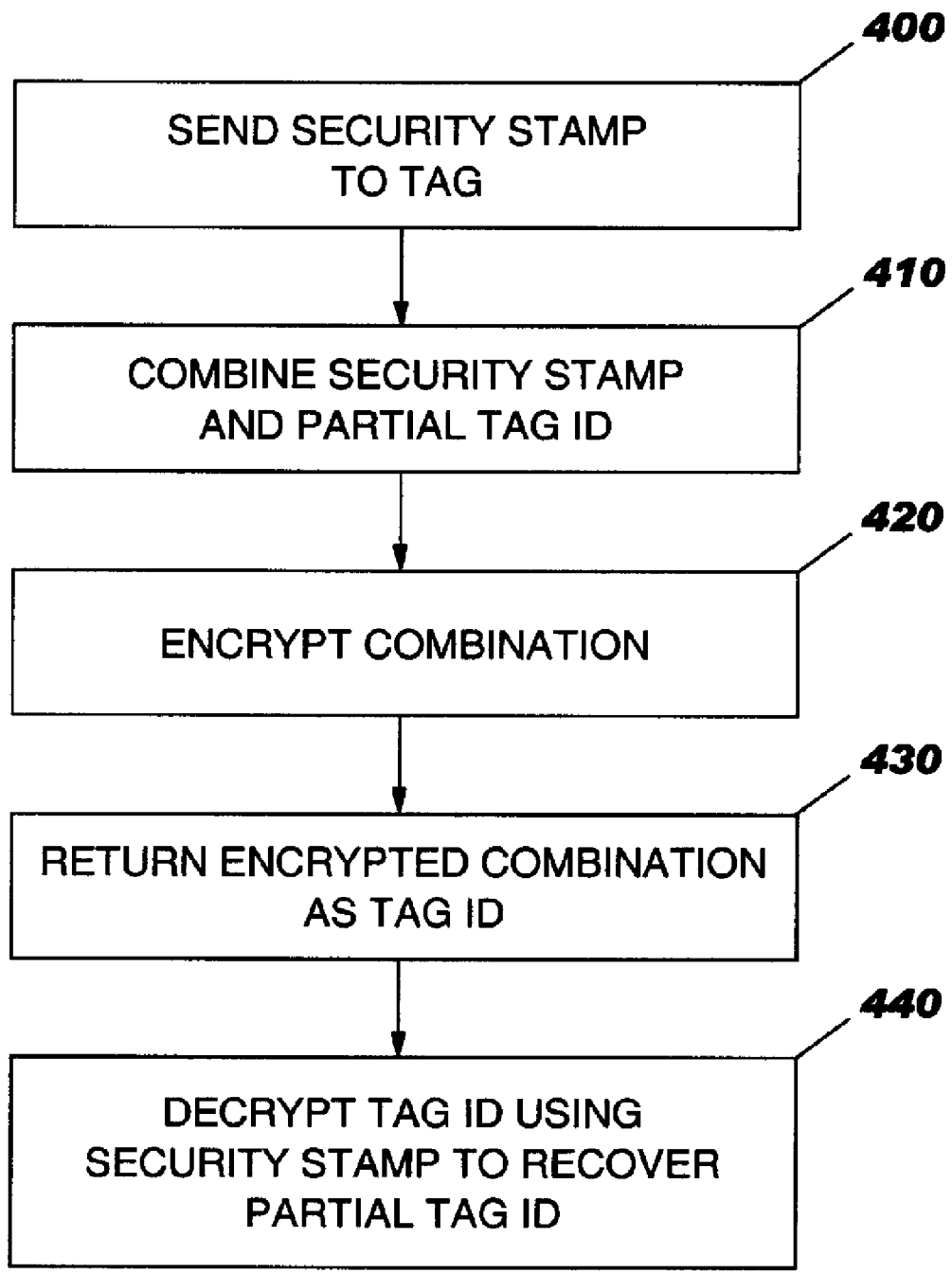

VERIFYING FINANCIAL SERVICES CARD TRANSACTIONS USING TAGS

FIELD OF THE INVENTION

The invention applies generally to the field of electronic commerce, and more particularly to verifying transactions with financial services cards such as credit cards, debit cards, check cashing cards, ATM cards, smart cards, and the like.

BACKGROUND

Financial-services cards, such as credit cards, debit cards, check cashing cards, ATM withdrawal cards, smart cards, and the like, are an important part of a convenience-driven consumer economy. Fraud, however, continues to be a significant drawback to using such cards.

For example, someone who makes a purchase at a point of sale terminal such as a grocery store cash register may swipe a magnetic-stripe credit card through a card reader provided at the cash register and sign the resulting sales slip, without ever showing the credit card itself to a cashier. In such circumstances, the cashier has no way of verifying the card user's identity by comparing a signature on the back of the card with the signature written on the sales slip. This provides an easy opportunity for the fraudulent use of lost or stolen credit cards, debit cards, and the like.

One way to diminish this risk is to require the card user to enter a personal identification number (PIN) into a keypad provided alongside the card reader. Unfortunately, introducing this extra step slows the transaction, and inconveniences rightful cardholders. Also, many people simply write their PIN on the financial services card for a fraudulent user to plainly see, thereby defeating the purpose of the PIN.

Thus, there is a need for a way of verifying the legitimacy of the user of a financial services card, without introducing an element of delay or inconvenience, and without opening the possibility of the card user perfunctorily defeating the verification method.

SUMMARY

To provide added security against fraud, a financial services card such as a credit card is paired with a separate tag such as an RFID tag. A system for minimizing fraud includes a card reader for reading a card ID, a tag reader for reading a tag ID, and a controller for comparing the card ID with the tag ID, and approving or rejecting a transaction based on the comparison. A method for minimizing fraud includes reading a card ID from the financial services card, reading a tag ID from the tag, comparing the tag ID with the card ID, and approving or rejecting a transaction based on the comparison. The card reader may send a security stamp to the tag, which may encrypt a combination of the security stamp and a partial tag ID and to provide the tag ID.

BRIEF DESCRIPTION OF THE SEVERAL VIEWS OF THE DRAWINGS

FIG. 4 is a flowchart showing aspects of using the tag of FIG. 3.

DETAILED DESCRIPTION OF THE INVENTION

Figure 1:
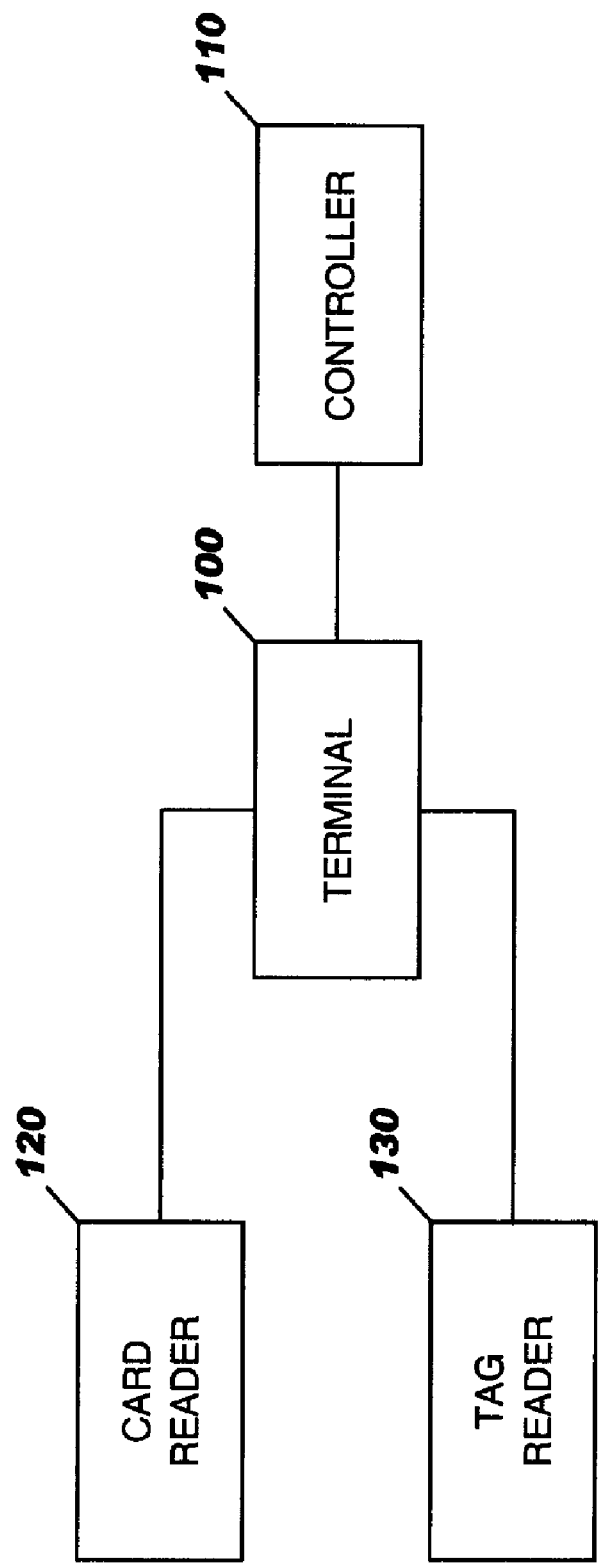
FIG. 1 is a block diagram showing an exemplary structure of a system for verifying a financial services card transaction using a tag.

The present invention will now be described more fully hereinafter, with reference to the accompanying drawings, in which illustrative embodiments of the invention are shown. Throughout the drawings, like numbers refer to like elements.

The invention may, however, be embodied in many different forms, and should not be construed as limited to the embodiments set forth herein; rather, these embodiments are provided so that the disclosure will be thorough and complete, and will fully convey the scope of the invention to those skilled in the art.

As will be appreciated by one of skill in the art, the present invention may be embodied as a system, apparatus, method, data processing system, or computer program product. Accordingly, the present invention may take the form of an embodiment entirely in hardware, entirely in software, or in a combination of aspects in hardware and software referred to as circuits and modules.

Furthermore, the present invention may take the form of a computer program product on a computer-usable storage medium having computer-usable program code embodied in the medium. Any suitable computer-readable medium may be used, including hard disks, CD-ROMs, optical storage devices, magnetic storage devices, and transmission media such as those supporting the Internet or an intranet.

Computer program code for carrying out operations of the present invention may be written in an object oriented programming language such as Java7, Smalltalk, or C++. However, the computer program code for carrying out operations of the present invention may also be written in conventional procedural programming languages, such as the C programming language. The program code may execute entirely on the user's computer, partly on the user's computer, as a stand-alone software package, partly on the user's computer and partly on a remote computer, or entirely on a remote computer. The remote computer may be connected to the user's computer through a local area network or a wide area network, or the connection may be made to an external computer, for example through the Internet using an Internet Service Provider.

The present invention is described below with reference to flowchart illustrations and block diagrams of methods, apparatus, systems, and computer program products according to embodiments of the invention. It will be understood that blocks of the flowchart illustrations and block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions and/or acts specified in the flowcharts and block diagram blocks.

These computer program instructions may also be stored in a computer-readable memory that can direct a computer or other programmable data processing apparatus to function in a particular manner, such that the instructions stored in the computer readable memory produce an article of manufacture including instruction means which implement the functions or acts specified in the flowcharts and block diagram blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions and/or acts specified in the flowcharts and block diagram blocks.

FIG. 1 is a block diagram showing a system for verifying a financial services card transaction using a tag. As shown in FIG. 1, a terminal 100 is operably connected to a controller 110, a card reader 120, and a tag reader 130.

In a preferred embodiment of the invention, the terminal 100 is a retail point-of-sale (POS) terminal such as a cash register terminal. The invention is not, however, so limited. In other embodiments, the terminal 100 may be an ATM terminal, a check cashing terminal, a kiosk workstation, a reservation terminal, an auction terminal, and so forth, generally including any kind of terminal used to provide transactions with financial services cards.

In a preferred embodiment of the invention, the controller 110 includes logic and memory that operate under stored program control, and would typically include or provide an interface to a database that associates the tag and the card as described below. The controller 110 may be a personal computer or workstation, a communication controller, a banking or retail store controller, a server, or a special purpose device.

In a preferred embodiment of the invention, the card reader 120 is a magnetic stripe reader suitable for reading the magnetic stripe that conventionally appears on the back of a credit card, debit card, ATM card, check-cashing card, and the like. The invention is not so limited, however, and the card reader 120 may be any reader suitable for reading information from a financial services card, such as a reader that receives wireless RF transmissions from a smart card, an optical reader such as a bar-code, OCR, or infrared reader, an inductive or capacitive reader, and so forth.

In a preferred embodiment of the invention, the tag reader 130 is a reader for a radio frequency identification (RFID) tag. The invention is not so limited, however, and the tag reader 130 may be any reader suitable for reading a tag. Here, a tag is to be construed as a portable medium that is physically separate from the financial services card, and which carries information that pertains to the intended user of a financial services card, or to the financial services card, or to an account that may be accessed using the financial services card; or carries information that may be used to deduce information that pertains to the intended user of the financial services card, or to the financial services card, or to an account that may be accessed using the financial services card. The tag may be passive, i.e., without an internal power source, or may be active, i.e., having an internal power source such as a cell or small battery. The tag may be, for example, a small object intended to be carried on a key ring. In some embodiments, the tag may be part of or may itself include a customer loyalty identifier of a financial services provider or a merchant.

Although FIG. 1 shows the terminal 100, the controller 110, the card reader 120, and the tag reader 130 as separate entities for descriptive clarity, any of these may be combined. In some embodiments, the card reader 120 may be an integral part of an ATM terminal; the tag reader 130 may be an integral part of an ATM terminal; the card reader 120 and the tag reader 130 may be combined, and so forth. In some embodiments, the terminal 100 and the controller 110 may be connected using a telecommunication link or service. For example, the two may communicate over the Internet or an intranet, in which circumstances the controller 110 could be thought of as a server, or the two could be connected using a local area network or other kind of public or private network, and so forth.

Figure 2:
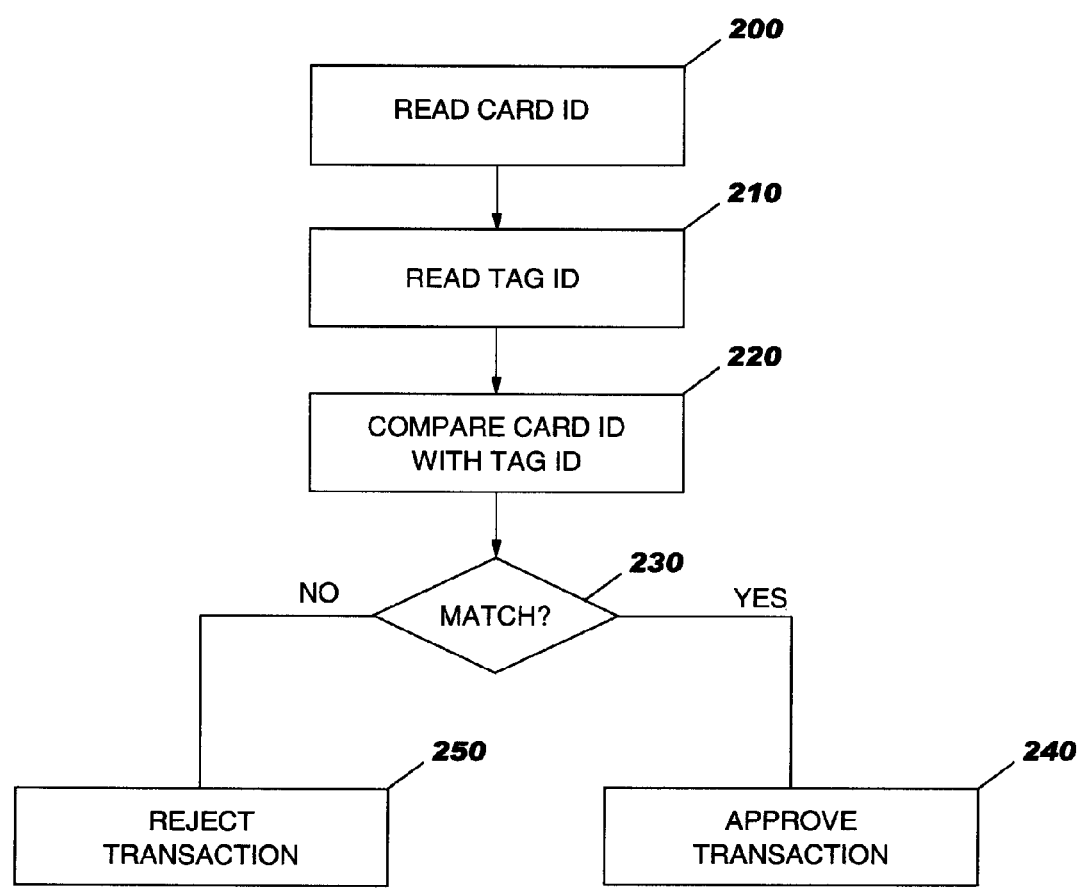
FIG. 2 is a flowchart showing aspects of a method for verifying a financial services card transaction suitable for the system of FIG. 1.

FIG. 2 is a flowchart showing aspects of a method for verifying a financial services card transaction suitable for the system described above with reference to FIG. 1. As shown in FIG. 2, a card identifier (card ID) and the data normally required for the transaction in question are read (step 200) from the financial services card by the card reader 120. In the case of a credit card, this data would typically include the credit card number. The card ID may be part of the data needed to support the transaction such as the card number, or may be separate.

The tag reader 130 reads a tag identifier (tag ID) from the tag (step 210). The tag ID is associated in a database with the financial services card through, for example, the account number or other data held by the financial services card. The tag ID may be a PIN, the name of the card holder expressed in a binary code, a randomly assigned or algorithmically generated binary identifier sequence, or the like, that is associated with the financial service card by the provider or the user of the card, or on behalf of the provider or the user of the card. For example, when a credit card is issued, a companion RFID tag may be issued at the same time, where the RFID tag includes a tag ID that is associated with the credit card in the card provider's database, which database may be accessed by the controller 110.

The terminal 100 receives the card ID from the card reader 120 and the tag ID from the tag reader 130, and forwards the card ID and the tag ID to the controller 110. The controller 110 compares the card ID with the tag ID, with reference to the aforementioned database that relates the two (step 220). If the card ID and the tag ID match (step 230), i.e., they are both assigned to the same person or account, the transaction is approved (step 240); otherwise, the transaction is rejected (250). Optionally, more complex rules may be applied to determine whether the transaction is approved or not. For example, small purchases may be approved for billing to a credit card in the absence of a tag, or billed to the credit card given the presence of the tag but the absence of the credit card.

Thus, depending on the rules employed to approve or reject the transaction, someone attempting to use a financial services card would ordinarily need to have possession of both the card and the accompanying tag. Although this provides a great deal more security than is available absent the invention, there is still a theoretical possibility that the tag might be spoofed. For example, in the case of an RFID tag with a PIN tag ID, an unscrupulous person might ping the tag using a clandestine tag reader, unbeknownst to the tag's legitimate owner, and create a second tag having the same PIN, thus enabling the spoofer to use the credit card if it is stolen later on.

Figure 3:
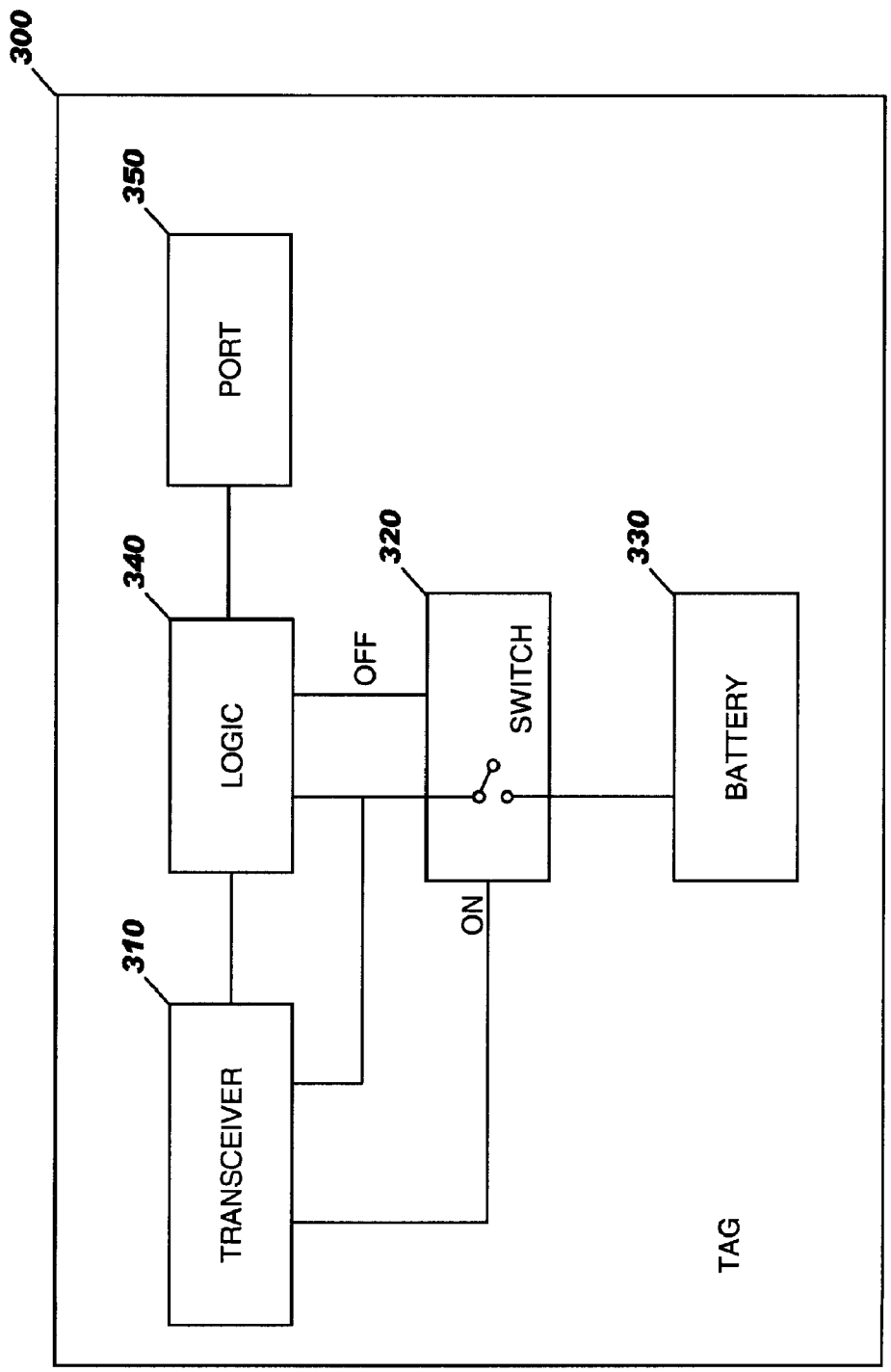
FIG. 3 is a block diagram showing an exemplary structure of a tag suitable for use in the system of FIG. 1.

FIG. 3 shows the block diagram of a tag 300 that addresses spoofing. Use of the tag of FIG. 3 is not a requirement of the system of FIG. 1 or the method of FIG. 2, which system and method may use other kinds of tags as mentioned above as well as the tag 300 of FIG. 3.

As shown in FIG. 3, the tag 300 includes a transceiver 310, a set-reset switch 320, a cell or battery 330, logic 340, and a port 350. The transceiver 310 includes functions and circuitry of the type found in a passive RFID tag. The transceiver 310 provides data communications with the tag reader 130, and, as explained below, receives a security stamp from the tag reader 130.

When the tag 300 comes into close proximity to the tag reader 130, the transceiver 310 may derive power from a field emitted by the tag reader 130, in the manner of a passive RFID tag. The derived power may be used to provide an electrical signal that operates the switch 320, which in this embodiment has a high control impedance, turning the switch 320 from off to on, thereby applying power from the battery 330 back to the transceiver 310 and to the logic 340. At the appropriate time, as described below, the logic 340 turns the switch 320 from on to off, thereby disconnecting the battery 320 from the transceiver 310 and the logic 340.

In the description of this embodiment that follows, the identifier stored in the tag 300 is called a partial tag ID. When the tag 300 is initialized, the partial tag ID and an encryption key are passed to the tag 300 through the port 350, and are stored in nonvolatile memory of the logic 340. When a transaction is up for approval, the tag ID is constructed from the partial tag ID and the current value of a security stamp passed to the tag 300 by the tag reader 130. The security stamp may be, for example, a random binary number chosen for this transaction, or the current clock time, or the like, so that the security stamp cannot be known a priori to a spoofer.

To construct the tag ID, the logic 340 combines the received security stamp and the partial tag ID, for example by concatenating or interleaving the two. The logic 340 encrypts the resulting combination to provide the tag ID. Any suitable encryption algorithm may be used, including standard single-key and key-pair algorithms. The logic 340 passes the so-constructed tag ID to the transceiver 310, and the transceiver 310 passes the tag ID to the tag reader 130. The logic 340 then turns the switch 330 off, thereby disconnecting the battery 330 from the transceiver 310 and the logic 340.

FIG. 4 shows an elaboration of FIG. 2, suitable for use with the tag 300 just described with reference to FIG. 3. As shown in FIG. 4, the tag reader 130 sends the security stamp to the tag 300 (step 400). The logic 340 combines the received security stamp and the partial tag ID (step 410), encrypts the resulting combination to provide the tag ID (step 420) using the preloaded encryption key, and returns the tag ID to the tag reader 130 (step 430). The tag reader 130 passes the tag ID to the terminal 100.

The terminal 100 passes the security stamp and the tag ID to the controller 110, which decrypts the tag ID in order to recover the partial tag ID (step 440), and proceeds as shown in FIG. 2, comparing the card ID with the partial tag ID (steps 220–250 of FIG. 2), with reference to the aforementioned database. With this embodiment, the tag 300 cannot be spoofed, unless the spoofer knows the partial tag ID and the encryption key stored in the tag 300.

Although the foregoing has described systems, methods, and computer program products for verifying a financial services card transaction using a tag, the description of the invention is illustrative rather than limiting; the invention is limited only by the claims that follow.

What is claimed is:

1. A tag to accompany a financial services card for verifying a financial services card transaction by reading a card ID from the financial services card, reading a tag ID from the tag, and approving a transaction with the financial services card based on comparing the card ID with the tag ID, said tag being separate from the financial services card, said tag comprising:

a transceiver to receive a security stamp from a tag reader and to return a tag ID to the tag reader;

logic to combine the security stamp with a partial tag ID previously stored in the tag and to encrypt the resulting combination using an encryption key previously stored in the tag, to provide the tag ID returned to the tag reader by the transceiver; and a battery and a high control impedance switch that applies the battery to power the transceiver and the logic, responsive to an electrical signal derived by passive components of the transceiver from a field emitted by the tag reader.

* * * * *